United States Patent [19]
Guibert et al.

[11] Patent Number: 5,725,351
[45] Date of Patent: Mar. 10, 1998

[54] GOLF ACCESSORY BAG FOR GOLF PULL CARTS

[76] Inventors: Chris P. Guibert, 4433 Third Ave. Northwest; Cameron J. Von Wald, 1703 Ninth Ave. Southeast, both of Rochester, Minn. 55901

[21] Appl. No.: 667,954

[22] Filed: Jun. 18, 1996

[51] Int. Cl.$^6$ ...................................................... B62B 1/12
[52] U.S. Cl. .................... 414/646; 224/274; 414/DIG. 6; D34/15
[58] Field of Search .................... 414/DIG. 6, 47.35, 414/646; 224/274; D34/15

[56] References Cited

U.S. PATENT DOCUMENTS

| | | | |
|---|---|---|---|
| D. 161,249 | 12/1950 | Darr | 280/DIG. 6 |
| D. 183,852 | 11/1958 | Marcus | D34/15 |
| D. 330,275 | 10/1992 | West | D34/15 |
| D. 331,557 | 12/1992 | Hurt . | |
| 2,551,009 | 5/1951 | Kaltenbach | 280/DIG. 6 |
| 2,582,435 | 1/1952 | Howard | 280/47.35 |
| 3,150,736 | 9/1964 | Kaufman | 280/DIG. 6 |
| 3,735,997 | 5/1973 | Seibold et al. . | |
| 4,339,061 | 7/1982 | Dunn . | |
| 4,759,559 | 7/1988 | Moulton | 280/DIG. 6 |
| 4,815,764 | 3/1989 | Carpenter . | |
| 4,890,856 | 1/1990 | Mursch et al. | 280/646 |
| 4,930,697 | 6/1990 | Takahashi et al. . | |
| 5,480,078 | 1/1996 | Verette et al. . | |

*Primary Examiner*—Thomas J. Brahan
*Attorney, Agent, or Firm*—Palmatier, Sjoquist, Helget & Voigt, P.A.

[57] ABSTRACT

The present invention is a golf accessory bag attached to a golf pull cart. The golf accessory bag is attached to a golf pull cart in a substantially triangular space located between the two wheels, the throat portion, and the golf bag platform. The golf accessory bag may comprise a shell having four corners and is formed of a triangular shaped bottom wall and three triangular shaped side walls. The golf accessory bag may have a plurality of chambers inside the shell and external pockets for transportation of personal golf items or accessories. During use, the golf accessory bag positions articles carried within the compartments rearward toward the golf bag platform to assist in the establishment of a center of gravity for the golf pull cart, having the golf accessory bag and golf club bag thereon, to a location the wheels to prevent the golf pull cart from tipping over onto the handle when released by a golfer. The golf accessory bag may be made of a rugged, yet flexible material to accommodate the folding of the golf pull cart during storage or transportation without removal of the golf accessory bag from the golf pull cart.

17 Claims, 2 Drawing Sheets

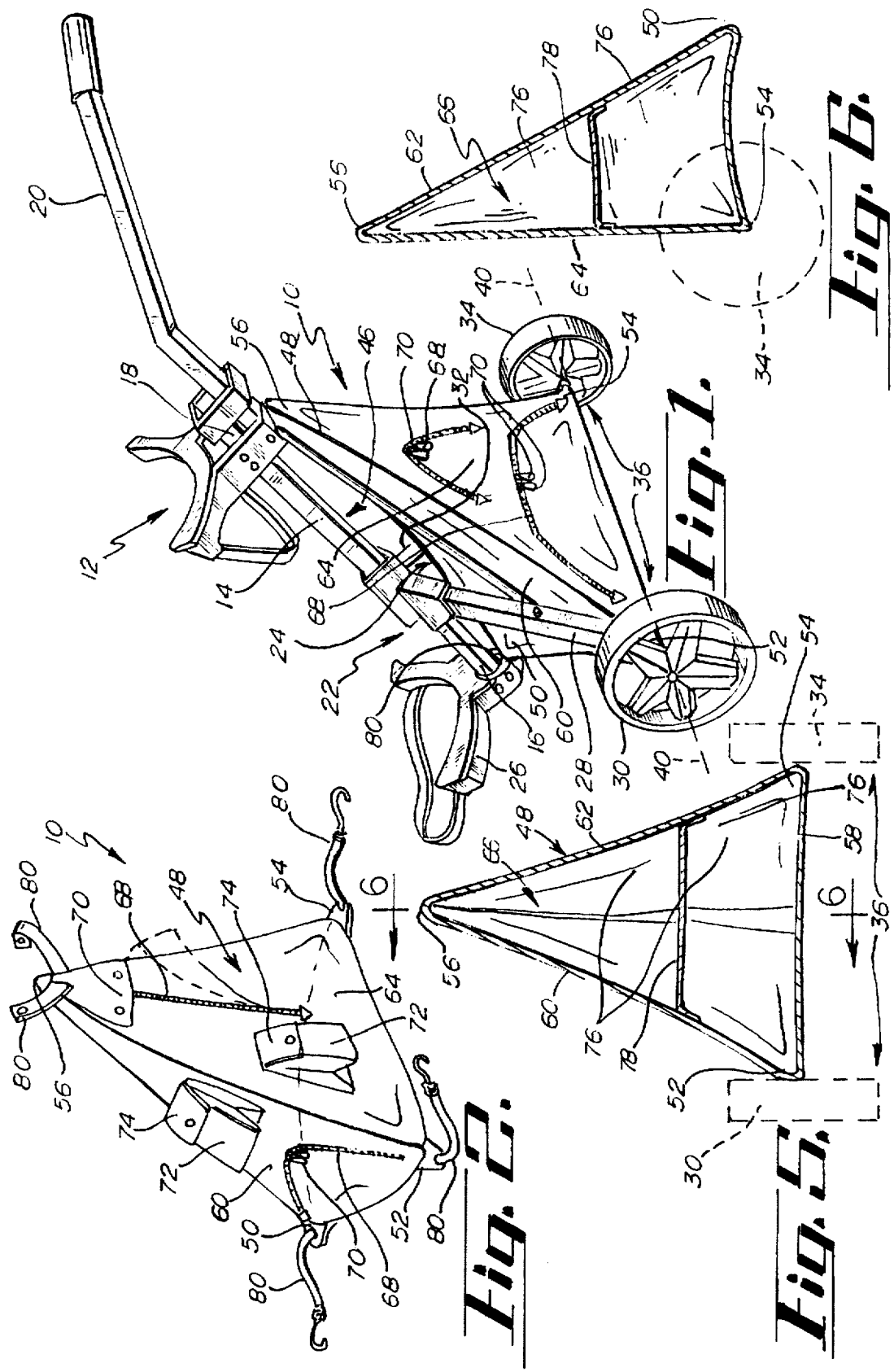

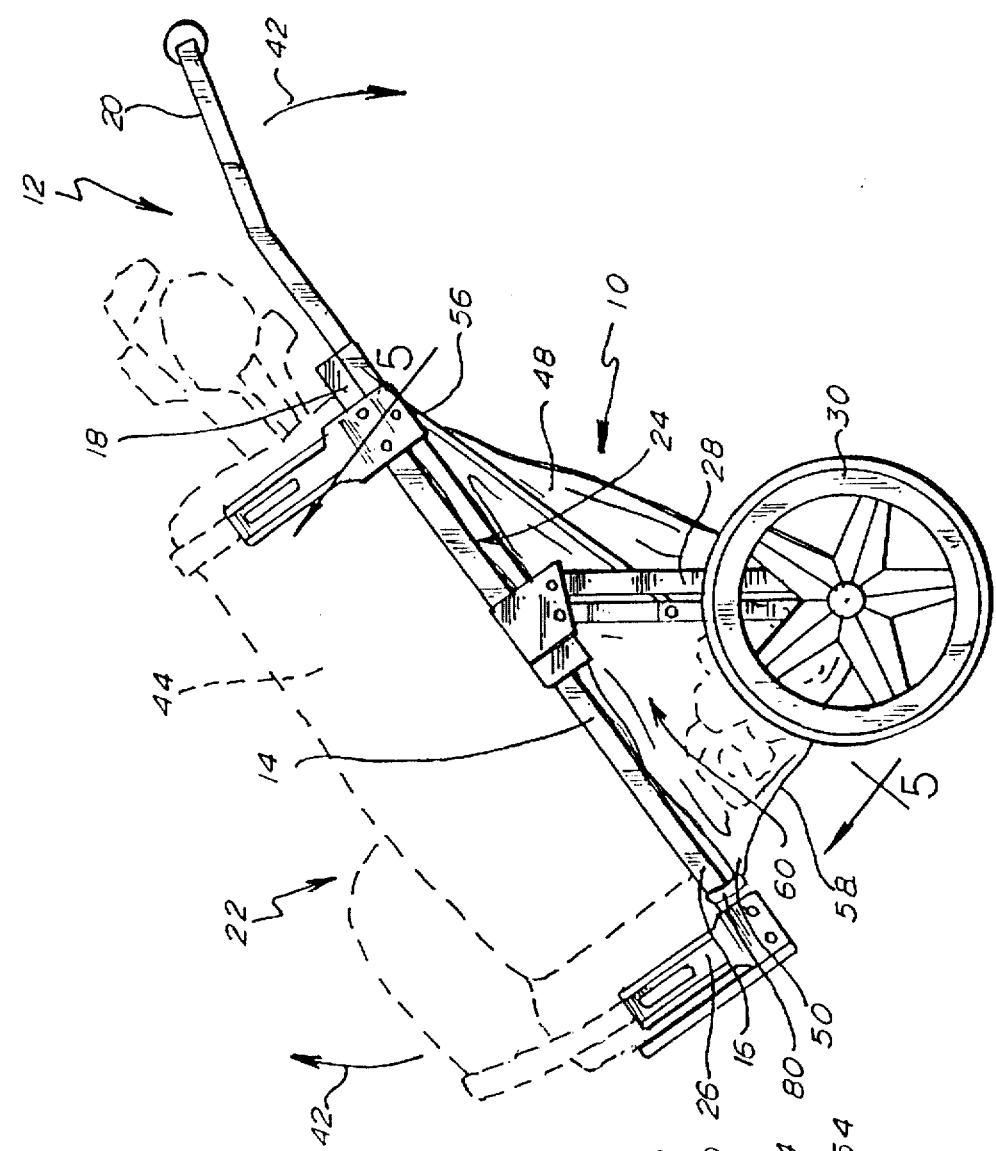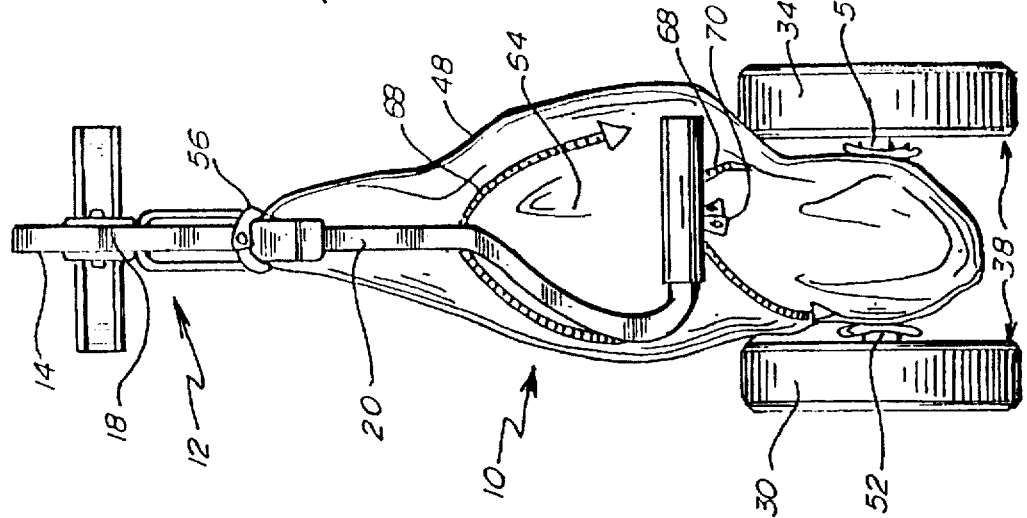

GOLF ACCESSORY BAG FOR GOLF PULL CARTS

BACKGROUND OF THE INVENTION

The present invention relates to the field of accessories for playing the game of golf. More specifically, the present invention relates to a golf accessory bag which is attachable to a standard golf pull cart for carrying personal articles and the like while playing golf.

Golf pull carts have previously been used to carry a golf bag containing a player's golf clubs. These golf carts and golf bags have been sufficient to transport golf clubs on a round of golf but have several disadvantages with respect to carrying additional personal items. Frequently, insufficient space is available for carrying of an individual's shoes, jacket, or beverages within a traditional golf bag.

Golf pull carts previously have incorporated a frame for supporting the golf bag on wheels for easily pulling or pushing the golf cart and for carrying the golf bag, during a round of golf. The golf bag, while having compartments for the golf clubs, does not have sufficient storage capacity for additional personal items. The golf bags used for carrying a set of golf clubs generally have one or more pockets for carrying golf balls and other small personal items such as eyeglasses and billfolds.

There is a need by golfers to carry additional personal items such as shoes, extra clothes, cellular or portable telephones, beepers, rain gear, food, and/or beverages while golfing. Traditional golf bag designs do not have the storage capacity to accommodate transportation of these personal items.

The present invention is designed to overcome the disadvantages of a traditional golf bag by the provision of a golf accessory bag for use on pull golf carts.

SUMMARY OF THE INVENTION

The present invention is a golf accessory bag attached to a golf pull cart. The golf accessory bag is attached to a golf pull cart in a substantially triangular space located between the two wheels, the throat portion, and the golf bag platform. The golf accessory bag may comprise a shell having four corners and is formed of a triangular shaped bottom wall and three triangular shaped side walls. The golf accessory bag may have a plurality of chambers inside the shell and external pockets for transportation of personal golf items or accessories. During use, the golf accessory bag positions articles carried within the compartments rearward toward the golf bag platform to assist in the establishment of a center of gravity for the golf pull cart, having the golf accessory bag and golf club bag thereon, to a location the wheels to prevent the golf pull cart from tipping over onto the handle when released by a golfer. The golf accessory bag may be made of a rugged, yet flexible material to accommodate the folding of the golf pull cart during storage or transportation without removal of the golf accessory bag from the golf pull cart.

It is a principle object of the present invention to provide a new and improved golf accessory bag of relatively simple and inexpensive design, construction, and operation for use in transporting personal items by golfers without fear of loss or damage to the personal property items during a round of golf.

Another object of the present invention is to provide a golf accessory bag for storing articles on a golf pull cart without causing the golf pull cart to tip over.

Still another object of the present invention is to provide a sturdy, yet flexible golf accessory bag attached to the underside of the golf pull cart, out of the way of the golfer, for storing accessories.

A feature of the present invention is a golf accessory bag having a plurality of internal chambers for separating certain articles from each other, for convenient access by a golfer during a round of golf.

Another feature of the present invention is the provision of a plurality of doors allowing access into the chambers of the golf accessory bag which are sealed by means such as Velcro® or zippers.

Still another feature of the present invention is the construction of the golf accessory bag from a resilient, yet flexible material which permits the golf accessory bag to be folded or compacted during the retraction of the legs of a golf pull cart during periods of storage or transportation, eliminating the necessity for the removal of the golf accessory bag from the golf pull cart during periods of non-use.

Still another feature of the present invention is the provision of a plurality of exterior pockets on the golf accessory bag for the storage of small personal items of a golfer during a round of golf.

Still another feature of the present invention is the transportation of personal items of a golfer within a substantially triangular space, which is located forwardly of the frame and rearwardly of the access of symmetry extending between the wheels of a golf pull cart, to assist in the establishment of a center of gravity which facilitates the retention of the golf pull cart in an upright position when the handle of the golf pull cart is released by a golfer.

Still another feature of the present invention is the provision of a substantially triangular shaped golf accessory bag for placement within the substantially triangular space located forwardly of a standard golf pull cart when the legs of the golf pull cart are manipulated into a first open operative position.

Still another feature of the present invention is the provision of the means for affixation which attaches the corners of the substantially triangular golf accessory bag to the frame of the golf pull cart for placement within the substantially triangular space located forwardly and underneath a standard golf pull cart.

Still another feature of the present invention is the provision of a plurality of triangular shaped sidewalls, each of the sidewalls including one or more exterior pockets for transporting small personal items by a golfer during a round of golf.

Still another feature of the present invention is the provision of a shelf within the interior of the compartment of the golf accessory bag for establishment of one or more chambers for transportation of personal items by a golfer during a round of golf.

Still another feature of the present invention is the provision of one or more doors for providing individual access into the chambers or compartments of the golf accessory bag.

An advantage of the present invention is the golf accessory bag is easily attached to a golf pull cart.

Another advantage of the present invention is the golf accessory bag does not interfere with the normal operation of the golf pull cart.

Still another advantage of the present invention is both hot and cold items may be stored in the golf accessory bag in separate compartments or chambers.

BRIEF DESCRIPTION OF THE DRAWINGS

FIG. 1 is a perspective view of the golf accessory bag on a golf pull cart.

FIG. 2 is a perspective view of the golf accessory bag unattached from the golf pull cart, particularly illustrating external pockets.

FIG. 3 is a back elevation view of the golf accessory bag mounted on a golf pull cart which has been folded into a second retracted storage position.

FIG. 4 is a side elevation view of the golf accessory bag on the golf pull cart illustrating the relative position of articles contained in the golf accessory bag.

FIG. 5 is the cross-sectional view taken at approximately the line of 5—5 of FIG. 4.

FIG. 6 is a cross-sectional view taken at approximately 6—6 of FIG. 5.

DETAILED DESCRIPTION OF THE PREFERRED EMBODIMENTS

One form of the invention is illustrated and described herein. The golf accessory bag is illustrated in general by the numeral 10. The golf accessory bag 10 is preferably affixed to a golf pull cart referenced in general by the numeral 12.

The golf pull cart 12 generally includes a frame 14 having a bottom 16 and a throat 18, a handle 20 extending upwardly from the throat 18, a bag side 22, and an underside 24. The golf pull cart 12 also includes a golf bag platform 26 which is affixed to the frame 14 proximate to the bottom 16 extending outwardly toward the bag side 22. The golf pull cart 12 also includes a first retractable leg 28 having a first wheel 30 rotatably engaged thereto. The golf pull cart 12 also includes a second retractable leg 32 having a second wheel 34 rotatably engaged thereto.

The first and second retractable legs 28, 32, respectively may each depend or extend outwardly from the frame 14 during manipulation into a first open operative position 36 as depicted in FIG. 1. The first and second retractable legs 28, 32 respectively, may be released and manipulated into a second retracted storage position 38 which is proximate to the frame 14, as depicted in FIG. 3, during periods of transportation and/or storage. The golf pull cart 12 also includes an axis of symmetry 40 which extends between the center rotational axis of the first and second wheel 30, 34, respectively. (FIGS. 1 and 4)

The golf pull cart 12 preferably has a center of gravity proximate to the golf bag platform 26 which generally maintains the golf pull cart 12 in an upright configuration when the handle 20 is released by a golfer during use. During use of the golf pull cart 12, a golfer grasps the handle 20, pivoting the handle 20 downwardly, which in turn raises the center of gravity upwardly as referenced by arrow 42 of FIG. 4 about the first and second wheels 30, 34, respectively. The golf pull cart 12 may then be pushed or pulled about the fairways of the golf course where the first and second wheels 30, 34, respectively engage and roll along the ground to support the golf pull cart 12 and golf bag 44 during a round of golf.

The golf bag 44 is generally engaged to the golf pull cart 12 on the bag side 22 of the frame 14. (FIG. 4)

The underside 24 is generally located beneath the frame 14 directly opposite to the bag side 22. When the first and second retractable legs 28, 32, respectively are manipulated into the first open operative position 36, a substantially triangular space 46 is defined within the underside 24 of the frame 14. (FIG. 1) The substantially triangular space 46 in general depends downwardly and outwardly from a position proximate to the throat 18 in a truncated pyramid shape where a forward plane is established which becomes integral with the access of symmetry 40 extending between the first and second wheels 30, 32, respectively. The substantially triangular space 46 also extends rearwardly from the access of symmetry 40 converging to a point immediately forward of the frame 14 proximate to the golf bag platform 26. It should be noted that the substantially triangular space 46 is integral with the underside 24 and functions as the location of the golf accessory bag 10 as engaged to the golf pull cart 12 during use by a golfer.

The golf accessory bag 10 is preferably formed of a shell 48 which in turn is formed of a rugged, flexible material which is adapted to accommodate folding into the second retracted storage position 38 during transportation and/or storage, thereby eliminating the necessity for removal of the golf accessory bag 10 from the golf pull cart 12 during periods of non-use. (FIG. 3) The rugged, flexible material for the shell 48 is preferably pliable and durable and may be formed of, or treated to be, water resistant or retardant material which may be selected from a group of material comprising canvas, nylon, gortex, or other synthetic materials which are durable and which resist or prevent moisture penetration.

The shell 48 may be formed of any other rugged and flexible material at the preference of an individual provided that the essential functions, features, and attributes described herein are not sacrificed.

The shell 48 preferably includes a first corner 50 which is preferably positioned proximate to the frame 14 proximate to the golf bag platform 26. The shell 48 also preferably includes a second corner 52 which is positioned proximate to the frame 14 proximate to the first wheel 30. The shell 48 also preferably includes a third corner 54 which is preferably positioned proximate to the frame 14 proximate to the second wheel 34. The shell 48 also preferably includes a fourth corner 56 which is positioned proximate to the frame 14 proximate to the throat 18. (FIGS. 1 and 2) Alternatively, the fourth corner 56 may be positioned between the throat 18 and the handle 20 or proximate to the handle 20 at the preference of an individual.

The shell 48 is preferably defined by a bottom wall 58 which is substantially triangular in shape extending between the first corner 50, the second corner 52, and the third corner 54. The shell 48 also preferably includes a first sidewall 60, which is also preferably triangular in shape extending between the first corner 50, the second corner 52, and the fourth corner 56. The shell 48 also preferably includes a second sidewall 62, which is preferably triangular in shape extending between the first corner 50, the third corner 54, and the fourth corner 56. The shell 48 also preferably includes a third sidewall 64, which is preferably triangular in shape, extending between the second corner 52, the third corner 54, and the fourth corner 56.

The bottom wall 58, first sidewall 60, second sidewall 62, and third sidewall 64 of the shell 48 define an internal compartment 66. (FIGS. 5 and 6) Access into the internal compartment 66 may be obtained through one or more doors 68. (FIGS. 1, 2, and 3) The doors 68 may be closed by a means for closure 70 which may comprise snaps, zippers, mating hook and loop fabric material, buttons, or any other preferred closure means 70 at the discretion of an individual provided that the essential functions, features, and attributes described herein are not sacrificed. (FIGS. 1 and 2)

One or more pockets 72 may be disposed on the exterior of the first sidewall 60, second sidewall 62, or third sidewall 64. (FIG. 2) Access to the pockets 72 may be accomplished by manipulation of a means for access 74 which may comprise flaps, zippers, buttons, mating hook or loop fabric material, or any other preferred access means 74 at the discretion of an individual provided that the essential functions, features, and attributes described herein are not sacrificed.

The positioning of the pockets 72 upon the exterior of the first sidewall 60, second sidewall 62, or third sidewall 64 may occur at any location as preferred by a golfer and are not restricted to the positions as indicated on FIG. 2. In addition, a plurality of pockets 72 may be positioned on any desired sidewall or a combination of pockets 72 may be disposed on the first sidewall 60, second sidewall 62, or third sidewall 64 for utilization to transport personal golf items such as golf balls, tees, sunglasses, and/or insect repellant and the like providing for convenient and easy retrieval by a golfer during a round of golf.

It should be noted that a golfer may elect to incorporate any number or combination of pockets 72 for either permanent or releasable affixation to the exterior of the shell 48 at the discretion of an individual. A golfer may therefore be provided with a flexible golf accessory bag 10 whereby the golfer is personally able to select a specific arrangement or combination of pockets 72 which satisfy the particular golfer's needs.

The golf accessory bag 10 may incorporate one large internal compartment 66 or may include either vertical or horizontal shelves 78 to establish a plurality of chambers 76 at the discretion of an individual. (FIGS. 5 and 6) As depicted in FIGS. 5 and 6, a horizontal shelf 78 preferably traverses the internal compartment 66 establishing two chambers 76. The horizontal shelf 78 may be affixed to the interior first sidewall 60, second sidewall 62, or third sidewall 64 by any preferred means including, but not limited to the use of mating hook and loop fabric material, stitching, snaps, zippers, and/or rivets provided that the essential functions, features, and attributes described herein are not sacrificed.

It should be noted that the material selected for the horizontal or vertical shelves 78 are preferably identical to the material selected for the shell 48 which provides for the rugged, flexible, or foldable material to accommodate transportation and/or storage of the golf accessory bag 10 when the golf pull cart 12 is manipulated into a second retracted storage position 38. It should also be noted that the incorporation of a plurality of vertical or horizontal shelves 78 does not affect the folding of the golf accessory bag 10 or the essential functions, features, and attributes disclosed herein.

The internal compartment 66, incorporating one or more shelves 78, thereby defining the chambers 76, may be used by a golfer to transport either hot or cold items, or clothing accessories such as sweaters, shoes, and/or rain gear at the discretion of a golfer. In addition, a golfer may utilize the internal compartment 66, or the chambers 76 to transport portable telephones, beepers, food and/or beverages, or one or more traditional items utilized by golfers including, but not limited to, golf balls, tees, eye glasses, sun screen, insect repellant, and/or billfolds.

It should be noted that any combination of vertical or horizontal shelves 78 may be incorporated within the internal compartment 66 to establish any number or combination of chambers 76 as desired by the golfer.

A means for affixation 80 preferably attaches the golf accessory bag 10 to the golf pull cart 12. The means for affixation 80 may be comprised of a number of duplicate means for affixation 80 permanently affixed to the golf accessory bag 10 proximate to the first corner 50, second corner 52, third corner 54, and fourth corner 56. Alternatively, the means for affixation 80 may vary at the discretion of an individual provided that the essential features, functions, and attributes described herein are not sacrificed. It should be noted that an individual may incorporate any combination of means for affixation 80 to affix the golf accessory bag 10 to the golf pull cart 12 as described herein.

As depicted in FIGS. 1 and 2, a means for affixation 80 is preferably affixed to the golf accessory bag 10 proximate to the first corner 50; another means for affixation 80 is preferably affixed to the golf accessory bag 10 proximate to the second corner 52; another means for affixation 80 is preferably affixed to the golf accessory bag proximate to the third corner 54; and an additional means for affixation 80 is preferably affixed to the golf accessory bag proximate to the fourth corner 56. It should be noted that the means for affixation 80 may be permanently or releasably attached to the golf accessory bag 10 at the discretion of an individual.

The means for affixation 80 may be comprised of straps incorporating mating hook and loop fastening material, straps incorporating snaps and/or buckles, and/or straps incorporating hooks at the preference of an individual. Alternatively, the means for affixation 80 may incorporate elastic cords having snaps, hooks, and/or buckles; or the means for affixation 80 may incorporate tying members as desired by an individual. (FIG. 2)

As depicted in FIGS. 1 and 2, a means for affixation 80 is preferably engaged to the golf accessory bag 10 proximate to the first corner 50. This means for affixation 80 is preferably adapted for engagement to the frame 14 proximate to the bottom 16, and golf bag platform 26. Another means for affixation 80 is preferably attached to the golf accessory bag 10 proximate to the second corner 52 for engagement to the frame 14 proximate to the first wheel 30. Another means for affixation 80 is preferably attached to the golf accessory bag 10 proximate to the third corner 54 which is adapted for engagement to the frame 14 proximate to the second wheel 34. In addition, another means for affixation 80 is preferably affixed to the golf accessory bag 10 proximate to the fourth corner 56 which is preferably adapted for engagement to the frame 14 proximate to the throat 18. Alternatively, the means for affixation 80 proximate to the fourth corner 56 may be engaged to the golf pull cart 12 between the throat 18 and the handle 20 or attached to the handle 20 at the preference of an individual. In addition, the means for affixation 80 may include a bracket, loop, ring, aperture, or other mechanism which is affixed or integral to the frame 14 and/or retractable legs 28, 32 for engagement of the golf accessory bag 10 to the golf pull cart 12.

It should be noted that it is not required that the means for affixation 80 be identical between the first corner 50, second corner 52, third corner 54, and/or fourth corner 56, and that an individual may utilize any combination for the means for affixation 80 described herein provided that the essential features, functions, and attributes described herein are not sacrificed. In addition, the means for affixation 80 may be comprised of a continuous elastic strap for engagement to the frame 14 proximate to four points adjacent to the golf bag platform 26, first wheel 30, second wheel 34, and/or throat 18. Alternatively, the elastic strap may be engaged to the golf pull cart 12 between throat 18 and the handle 20, or alternatively attached to the handle 20 at the preference of an individual.

It should also be noted that other means for affixation 80 may be incorporated into the golf accessory bag 10 for engagement to the golf pull cart 12, at alternative locations such as along the seams extending between the first sidewall 60, and second sidewall 62, the first sidewall 60 and the third sidewall 64, and the second sidewall 62, and the third sidewall 64. These additional means for affixation 80 may be attached to the first or second retractable legs 28, 32, or to the frame 14, between the golf bag platform 26 and the throat 18, at the preference of an individual. It should also be noted that any combination of means for affixation 80 may be incorporated at the preference of a golfer.

It should further be noted that the means for affixation 80 as described herein, as attached to the golf accessory bag 10, may alternatively be affixed to the bottom wall 58 proximate to the first corner 50, second corner 52, or third corner 54, as preferred by an individual. In addition, the means for affixation 80 may be attached or affixed to either the first sidewall 60, second sidewall 62, and/or third sidewall 64 proximate to the fourth corner 56 at the discretion of a golfer. (FIGS. 1 and 2)

Following engagement of the means for affixation 80 to the frame 14 of the golf pull cart 12, the first retractable leg 28 and the second retractable leg 32 may be manipulated into a first open operative position 36. During manipulation of the golf pull care 12 into this configuration, the first corner 50 of the golf accessory bag 10 is generally pulled rearwardly. The second corner 52, and the third corner 54 are simultaneously pulled laterally and outwardly during manipulation of the first retractable leg 28 and second retractable leg 32 into the first operative position 36. In turn, the third sidewall 64 is preferably pulled taut into a substantially planar configuration between the throat 18 and the axis of symmetry 40 extending between the first wheel 30 and the second wheel 34. In this configuration, the third sidewall 64 preferably forces or urges personal items transported within the internal compartment 66 or plurality of chambers 76 rearwardly toward the golf bag platform 26.

The rearward positioning of personal items in turn assists in the establishment of a center of gravity which is preferably at or rearwardly of the axis of symmetry 40, which extends between the first and second wheels 30, and 34, respectively. The positioning of transported items at or rearwardly of the axis of symmetry between the first and second wheels 30, 34 respectively, functions to prevent the inadvertent tipping of the golf pull cart 12 onto the handle 20 when released by a golfer. The rearward placement of the center of gravity for the golf accessory bag 10 at or behind the axis of symmetry 40 facilitates the engagement of the golf bag platform 26 with the ground when the handle 20 is released by a golfer. Inadvertent or undesired tipping of the golf pull cart 12 during use is thereby minimized.

When the golf pull cart 12 is manipulated into the first open operative position 36, then the golf accessory bag 10 is preferably positioned within the substantially triangular space 46 which is integral to the underside 24. The purpose for the placement of the golf accessory bag 10 within the substantially triangular space 46 is to distribute the weight of transported items rearwardly of the axis symmetry extending between the first and second wheels 30, 34 during use of the golf pull cart 12. It should also be noted that the golf accessory bag 10 does not alter or otherwise affect the normal weight distribution for the golf pull cart 12 or otherwise affect the performance of the golf pull cart 12 during use by a golfer.

Alternatively, following a period of use, the golf pull cart 12 may be folded into a second retracted storage position 38 as depicted in FIG. 3. During manipulation into this position, the first retractable leg 28 and second retractable leg 32 are released and are manipulated inwardly and rearwardly for positioning proximate to the frame 14 and the golf bag platform 26. The retraction of the first retractable leg 28 and second retractable leg 38 facilitates the transportation and/or storage of the golf pull cart 12, golf accessory bag 10, and golf bag 44 during periods of non-use. It is intended that the golf accessory bag remain engaged to the golf pull cart 12 during periods of storage and non-use, eliminating the necessity for removal therefrom. During positioning of the golf pull cart 12 into the second retracted storage position 38, it is intended that the rugged flexible material becomes compacted permitting the transportation of the golf pull cart 12 without removal of the golf accessory bag 10.

It is intended that the means for affixation 80 are adapted for releasable affixation of the golf accessory bag 10 to the golf pull cart 12. The releasable feature of the means for affixation 80 enables an individual to remove the golf accessory bag 10 for cleaning as desired by an individual. It is intended that the golf accessory bag 10 be reattached to the golf pull cart 12 during periods of storage or non-use.

The present invention may be embodied in other specific forms without departing from the spirit or essential attributes thereof and it is therefore desired that the present embodiment be considered in all respects as illustrative and not restrictive, reference being made to the appended claims rather than to the foregoing description to indicate the scope of the invention.

What is claimed:

1. A combination golf pull cart and golf accessory bag comprising:
    (a) a golf pull cart comprising:
        (i) a frame having a bottom, a throat portion, a foldable handle extending from the throat portion, and an underside disposed below the frame;
        (ii) a pair of retractable legs engaged to the frame, a wheel rotatably mounted on each leg, the retractable legs having a first open operative position, and a second retracted storage position;
        (iii) a golf bag platform extending outwardly from the frame to a golf bag side of the frame and proximate to the bottom;
        (iv) a triangular space proximate to the underside extending between the pair of retractable legs when positioned in the first open operative position said triangular space positioned away from the golf bag side of the frame, said triangular space extending to a location proximate to the golf bag platform, and said triangular space extending upwardly to a location proximate to the throat portion; and
    (b) the golf accessory bag affixed to the frame and positioned in the triangular space, the golf accessory bag comprising:
        (i) a shell defining at least one compartment;
        (ii) a door in communication with each of the compartments; and
        (iii) a means for affixation of the golf accessory bag to the golf pull cart.

2. The combination invention of claim 1, the golf accessory bag further comprising a bottom wall having a substantially triangular shape.

3. The combination invention of claim 2, the bottom wall comprising:
    (a) a first corner positioned proximate to the golf bag platform;

(b) a second corner positioned proximate to one of the pair of retractable legs; and (c) a third corner positioned proximate to the other of the pair of retractable legs.

4. The combination invention of claim 3, the means for affixation comprising:

(a) a first strap affixed to the golf accessory bag proximate to the first corner;

(b) a second strap affixed to the golf accessory bag proximate to the second corner; and (c) a third strap affixed to the golf accessory bag proximate to the third corner.

5. The combination invention of claim 3, the golf accessory bag further comprising a fourth corner positioned proximate to the throat portion.

6. The combination invention of claim 3, the golf accessory bag further comprising a fourth corner positioned proximate to the handle.

7. The combination invention of claim 5, the golf accessory bag further comprising:

(a) a first sidewall defined by the first corner, the second corner, and the fourth corner;

(b) a second sidewall defined by the first corner, the third corner, and the fourth corner; and (c) a third sidewall defined by the second corner, the third corner, and the fourth corner.

8. The combination invention of claim 7 wherein the first sidewall, second sidewall, third sidewall, and bottom wall define the compartment.

9. The combination invention of claim 1, the golf accessory bag further comprising a shelf traversing said compartment defining at least two chambers.

10. The combination invention of claim 9, further comprising a plurality of doors, each of said doors providing access into one of said chambers.

11. The combination invention of claim 1, further comprising at least one pocket on the shell of the golf accessory bag.

12. The combination invention of claim 1, the means for affixation further comprising straps having buckles.

13. The combination invention of claim 1, the means for affixation further comprising of hook and loop fabric material.

14. The combination invention of claim 1, the means for affixation further comprising elastic straps on the golf accessory bag for resiliently connecting the golf accessory bag to the golf pull cart.

15. The combination invention of claim 1, the shell of the golf accessory bag comprising a pliable material permitting positioning of the retractable legs into the second storage position without the removal of the golf accessory bag from the golf pull cart.

16. The combination invention of claim 1, each door comprising a means for access.

17. A combination golf pull cart and golf accessory bag comprising:

(a) a golf pull cart comprising:

(i) a frame having a bottom, a throat portion, a foldable handle extending from the throat portion, and an underside disposed below the frame;

(ii) a pair of retractable legs engaged to the frame, a wheel rotatably mounted on each leg, the retractable legs having a first open operative position and a second retracted storage position;

(iii) a golf bag platform extending outwardly from the frame to a golf bag side of the frame and proximate to the bottom;

(iv) a triangular space proximate to the underside extending between the pair of retractable legs when positioned in the first open operative position, said triangular space positioned away from the golf bag side of the frame, said triangular space extending to a location proximate to the golf bag platform, and said triangular space extending upwardly to a location proximate to the throat portion; and (b) the golf accessory bag affixed to the frame and positioned in the triangular space, the golf accessory bag comprising:

(i) a shell defining a compartment, the shell having a first corner positioned proximate to the golf bag platform, a second corner positioned proximate to one of the pair of retractable legs, a third corner positioned proximate to the other of the pair of retractable legs, and a fourth corner positioned proximate to the throat portion;

(ii) a means for affixation for attaching the golf accessory bag to the golf pull cart; and (iii) an opening in the shell for providing access into the compartment, the shell further comprising a door, said door comprising a means for access for closing the door.

* * * * *